(12) United States Patent
Huang et al.

(10) Patent No.: US 7,551,426 B2
(45) Date of Patent: Jun. 23, 2009

(54) PORTABLE ELECTRONIC APPARATUS WITH FUNCTION OF ADJUSTING TILT ANGLE OF BODY AND BASE THEREOF

(75) Inventors: Wen-Yi Huang, Taipei (TW); Po-An Lin, Taipei (TW); Kang-Yeh Yu, Taipei (TW)

(73) Assignee: Compal Electronics, Inc., Taipei (TW)

( * ) Notice: Subject to any disclaimer, the term of this patent is extended or adjusted under 35 U.S.C. 154(b) by 172 days.

(21) Appl. No.: 11/693,731

(22) Filed: Mar. 30, 2007

(65) Prior Publication Data

US 2008/0024975 A1 Jan. 31, 2008

(30) Foreign Application Priority Data

Jul. 26, 2006 (TW) .............................. 95127242 A

(51) Int. Cl.
*G06F 1/16* (2006.01)
(52) U.S. Cl. ............................. 361/679.02; 361/679.26
(58) Field of Classification Search .................. 361/686, 361/683
See application file for complete search history.

(56) References Cited

U.S. PATENT DOCUMENTS

| | | | | |
|---|---|---|---|---|
| 5,144,290 A * | 9/1992 | Honda et al. | ................ | 345/156 |
| 6,006,243 A * | 12/1999 | Karidis | ........................ | 708/100 |
| 6,108,200 A * | 8/2000 | Fullerton | .................... | 361/686 |
| 6,862,171 B1 | 3/2005 | Maskatia et al. | | |
| 6,980,426 B2 * | 12/2005 | Kim | .......................... | 361/683 |
| 7,035,094 B2 * | 4/2006 | Huang et al. | ................ | 361/683 |
| 7,099,150 B2 * | 8/2006 | Lee | ............................. | 361/683 |
| 2004/0150945 A1* | 8/2004 | Mache et al. | ............... | 361/683 |
| 2005/0207112 A1* | 9/2005 | Bakker et al. | ............... | 361/686 |

* cited by examiner

*Primary Examiner*—Lisa Lea-Edmonds
(74) *Attorney, Agent, or Firm*—Jianq Chyun IP Office

(57) ABSTRACT

A base suitable for a portable electronic apparatus is provided. The portable electronic apparatus includes a first body which has a first electrical connector. The base includes a second body, a supporting member, and a second electrical connector. The supporting member has a first end and a second end opposite to the first end. The first end is pivotally connected to the second body along a first rotation axis. The second electrical connector for connecting with the first electrical connector is pivotally connected to the second end along a second rotation axis. In addition, the second body has a recess for accommodating the supporting member and the second electrical connector after rotation. A portable electronic apparatus which has the base is also provided.

12 Claims, 7 Drawing Sheets

PORTABLE ELECTRONIC APPARATUS WITH FUNCTION OF ADJUSTING TILT ANGLE OF BODY AND BASE THEREOF

CROSS-REFERENCE TO RELATED APPLICATION

This application claims the priority benefit of Taiwan application serial no. 95127242, filed Jul. 26, 2006. All disclosure of the Taiwan application is incorporated herein by reference.

BACKGROUND OF THE INVENTION

1. Field of the Invention

The present invention relates to an electronic apparatus. More particularly, the present invention relates to a portable electronic apparatus with a function of adjusting a tilt angle of a body and a base thereof.

2. Description of Related Art

Currently, in the era of information explosion, electronic products and daily life have been closely related. With the continuous progress of electronic technology, humanized electronic products with fine functions have been continuously put forward.

With regard to the development and application of personal computers, desktop personal computers (desktop PCs) are firstly developed, but desktop personal computers are quite bulky and cannot be easily carried. Therefore, notebook PCs are then developed. Further, with the advance of science and technology, tablet PCs are then developed.

The tablet PC is convenient in use, and can be placed on an arm, a desk top or even thighs and operated with a stylus in the absence of other accessories, such as a keyboard or a mouse.

However, when additional functions are needed, a user can also install the tablet PC on a docking station for the tablet PC. A keyboard may be disposed on the docking station and a mouse may be linked to the docking station. At this time, the tablet PC can also be operated with the keyboard and the mouse. Furthermore, the docking station can further include a optical disk driver, an expanding hard disk driver, a battery, and so on, so as to provide the functions in addition to press input and cursor control.

Referring to U.S. Pat. No. 6,862,171 (hereinafter "patent '171" for short), entitled "Portable Electronic Device with a Sliding Unit," patent '171 is characterized by disposing sliding slots and sliding units on both sides of a base module, and disposing a cross bar between the two sliding units for a system module to be mounted thereon. Therefore, the user can adjust the position of the system module above the base module and the pitch angle of the system module according to actual requirements.

However, the portable electronic apparatus disclosed in patent '171 has at least the following disadvantages.

1. The roller of the sliding unit is designed to have a complicated structure, so it is difficult to control the accuracy and to assemble and position the roller.

2. The sliding unit has a long sliding travel which requires a long sliding slot, which affects the appearance.

3. Noises are generated due to friction when the roller is rolling in the sliding slot.

SUMMARY OF THE INVENTION

In view of the above, the present invention is directed to a base applicable to a portable electronic apparatus, so as to provide an optimal design.

The present invention is further directed to a portable electronic apparatus with an optimal design.

As embodied and broadly described herein, the present invention provides a base applicable to a portable electronic apparatus. The portable electronic apparatus includes a first body which has a first electrical connector. The base includes a second body, a supporting member, and a second electrical connector. The supporting member has a first end and a second end opposite to the first end. The first end is pivotally connected to the second body along a first rotation axis. The second electrical connector for connecting the first electrical connector is pivotally connected to the second end along a second rotation axis. When the second electrical connector is connected to the first electrical connector, the angle of the supporting member relative to the second body varies corresponding to the height of the second electrical connector relative to the second body, while the angle of the second electrical connector relative to the supporting member varies corresponding to the angle variation of the first body relative to the second body.

Furthermore, the second body has a recess for accommodating the supporting member and the second electrical connector after rotation, such that a first flat surface of the first body is suitable for overlapping with a second flat surface of the second body.

In an embodiment of the present invention, the base further includes a first hinge through which the first end of the supporting member is pivotally connected to the second body.

In an embodiment of the present invention, the base further includes a second hinge through which the second electrical connector is pivotally connected to the second end of the supporting member.

In an embodiment of the present invention, the first rotation axis of the base is substantially parallel to the second rotation axis.

In an embodiment of the present invention, the base further includes a locator disposed on the second body to temporarily fix the position of the first body relative to the second body.

In an embodiment of the present invention, the locator of the base is a non-skid layer.

As embodied and broadly described herein, the portable electronic apparatus provided by the present invention includes a first body, a first electrical connector, a second body, a supporting member, and a second electrical connector. The first electrical connector is fixedly disposed on the first body. The supporting member has a first end and a second end opposite to the first end. The first end is pivotally connected to the second body along a first rotation axis. The second electrical connector for connecting the first electrical connector is pivotally connected to the second end along the second rotation axis. When the second electrical connector is connected to the first electrical connector, the angle of the supporting member relative to the second body varies corresponding to the height of the second electrical connector relative to the second body, while the angle of the second electrical connector relative to the supporting member varies corresponding to the angle variation of the first body relative to the second body.

Furthermore, the second body has a recess for accommodating the supporting member and the second electrical connector after rotation, such that a first flat surface of the first body is suitable for overlapping with a second flat surface of the second body.

In an embodiment of the present invention, the portable electronic apparatus further includes a first hinge through which the first end of the supporting member is pivotally connected to the second body.

In an embodiment of the present invention, the portable electronic apparatus further includes a second hinge through which the second electrical connector is pivotally connected to the second end of the supporting member.

In an embodiment of the present invention, the first rotation axis of the portable electronic apparatus is substantially parallel to the second rotation axis.

In an embodiment of the present invention, the portable electronic apparatus further includes a locator disposed on the first body or the second body to temporarily fix the position of the first body relative to the second body.

In an embodiment of the present invention, the locator of the portable electronic apparatus is a non-skid layer.

In an embodiment of the present invention, the second body of the portable electronic apparatus is a computer docking station, and the first body is a tablet PC.

In an embodiment of the present invention, the second body of the portable electronic apparatus is a computer system base, and the first body is a display.

The present invention adopts the supporting member to replace the conventional sliding slots and the sliding units, so as to provide an optimal design.

In order to the make aforementioned and other objects, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
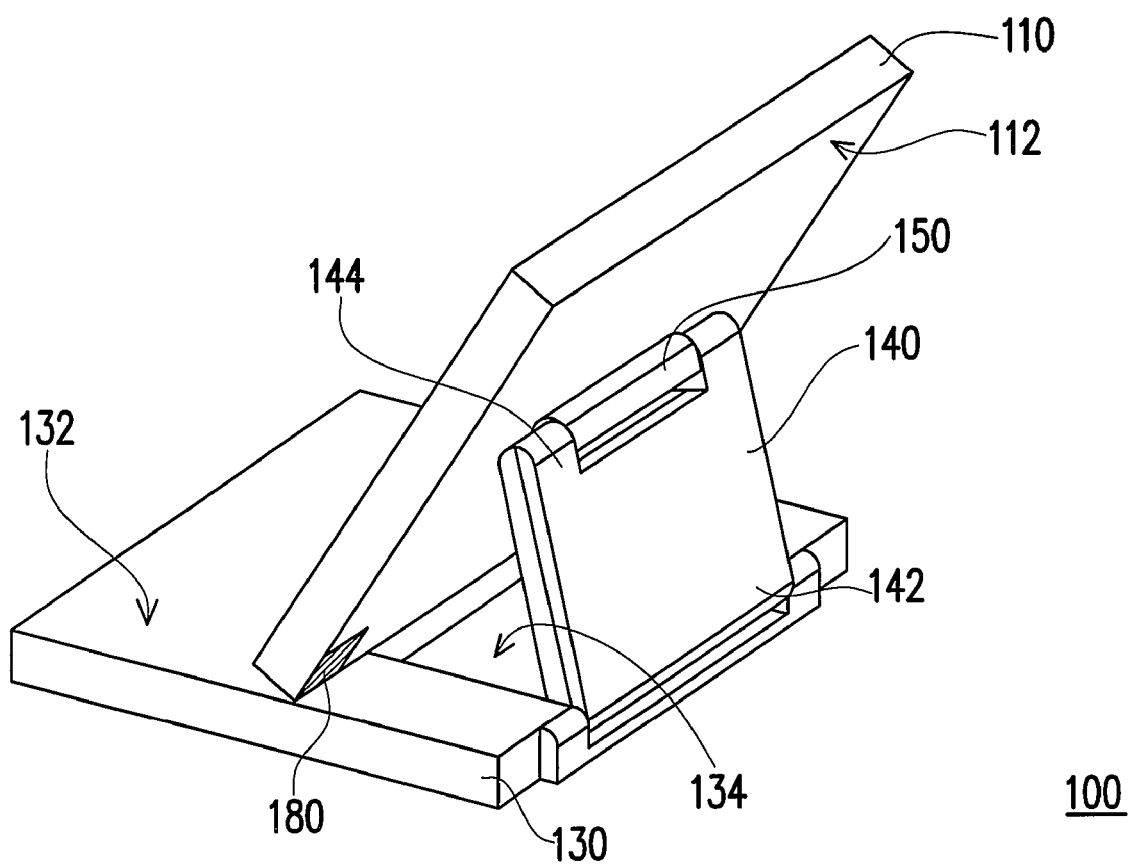
FIG. 1A is a perspective view of the portable electronic apparatus according to an embodiment of the present invention.
Figure 1B:
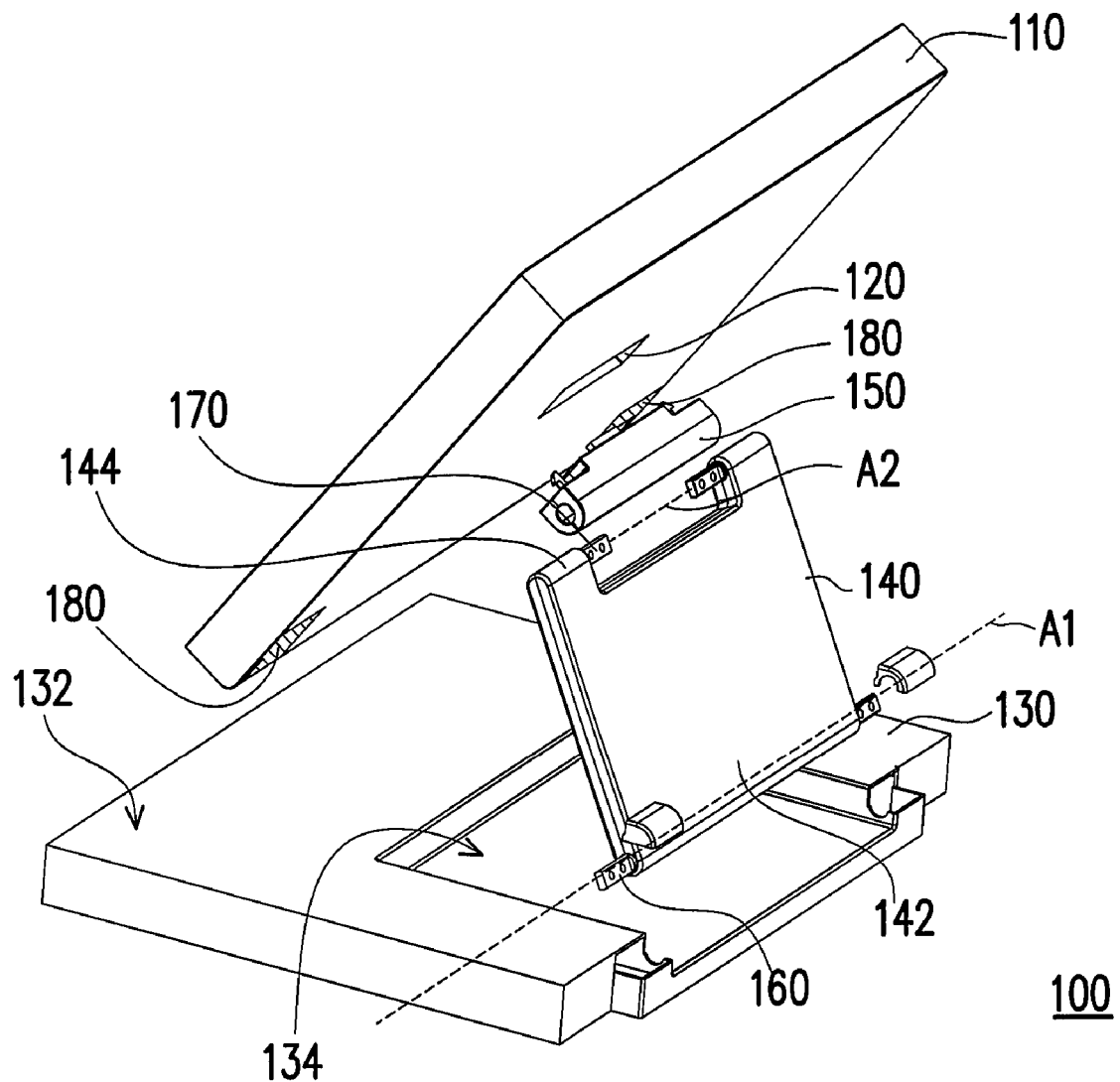
FIG. 1B is an exploded view of the portable electronic apparatus of FIG. 1A.

FIG. 1A is a perspective view of the portable electronic apparatus according to an embodiment of the present invention, and FIG. 1B is an exploded view of the portable electronic apparatus in FIG. 1A. Referring to FIGS. 1A and 1B, a portable electronic apparatus 100 includes a first body 110, a first electrical connector 120 (as shown in FIG. 1B), a second body 130, a supporting member 140, and a second electrical connector 150.

The first electrical connector 120 is fixed on the first body 110. The supporting member 140 has a first end 142 and a second end 144 opposite to the first end 142. The first end 142 is pivotally connected to the second body 130 along a first rotation axis A1 (as shown in FIG. 1B). The second electrical connector 150 for connecting the first electrical connector 120 is pivotally connected to the second end 144 along a second rotation axis A2. The first rotation axis A1 is substantially parallel to the second rotation axis A2.

The first body 110 and the second body 130 are, for example, a tablet PC and a computer docking station, respectively. Alternatively, the first body 110 and the second body 130 can also be a display and a computer system base, respectively. When the first body 110 and the second body 130 are a tablet PC and a computer docking station, respectively, for the convenience of taking along, the first body 110 and the second body 130 are separated (i.e., the first electrical connector 120 and the second electrical connector 150 are separated). In this manner, a user can carry the first body 110 only and operate it with a stylus (not shown).

However, when additional functions are required, the first body 110 is combined with the second body 130 through the first electrical connector 120, the second electrical connector 150, and the supporting member 140 (as shown in FIG. 1A). The second body 130 can have a keyboard module, and the user can input characters and commands with the keyboard module. Furthermore, the second body 130 can further include an optical disk driver, a hard disk driver, a battery, and so on, so as to provide additional functions for the first body 110.

When the second electrical connector 150 is connected to the first electrical connector 120, the angle of the supporting member 140 relative to the second body 130 varies corresponding to the height of the second electrical connector 150 relative to the second body 130, while the angle of the second electrical connector 150 relative to the supporting member 140 varies corresponding to the angle variation of the first body 110 relative to the second body 130.

In brief, the second electrical connector 150 rotates along the second rotation axis A2, and the supporting member 140 rotates along the first rotation axis A1. The first body 110 has different use aspects above the second body 130. The different use aspects are further described as follows.

FIGS. 2A-2E illustrate the transition of the two bodies of the portable electronic apparatus in FIG. 1A from a first use aspect to a second use aspect. Referring to FIG. 2A-2E, the second body 130 has a recess 134 for accommodating the supporting member 140 and the second electrical connector 150 after rotation, such that a first flat surface 112 of the first body 110 is suitable for overlapping with a second flat surface 132 of the second body 130.

Figure 2A:
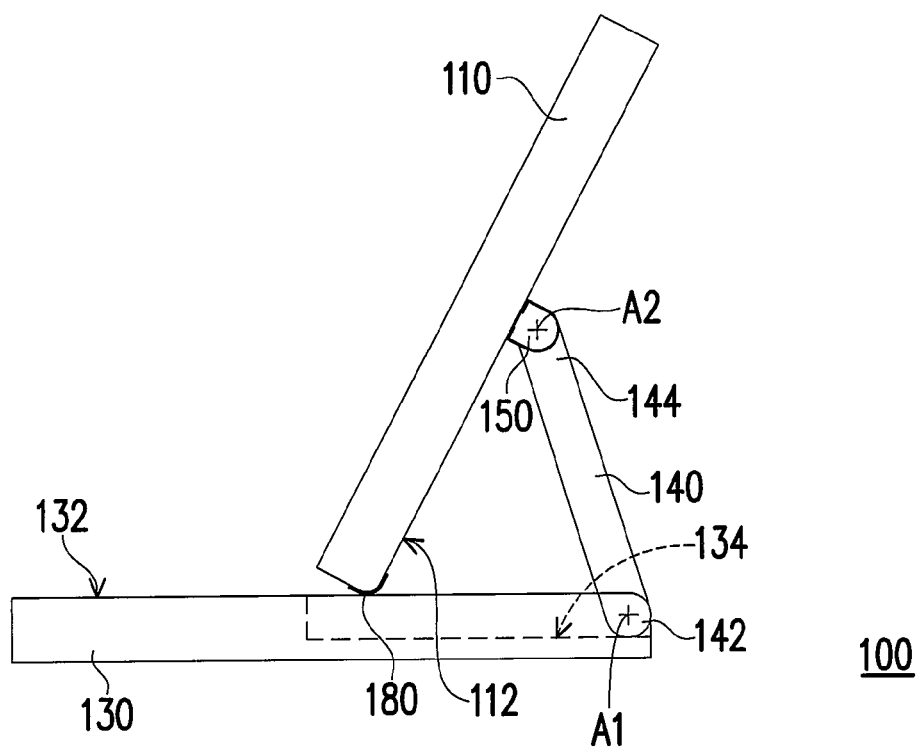
FIGS. 2A-2E illustrate the transition of the two bodies of the portable electronic apparatus in FIG. 1A from a first use aspect to a second use aspect.
Figure 2B:
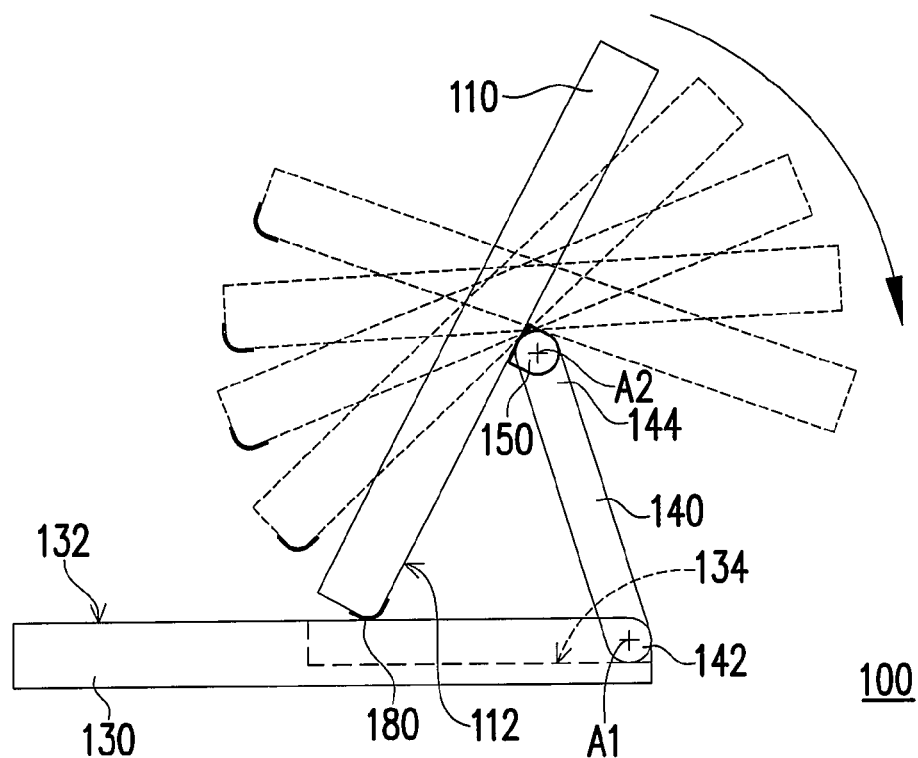
Figure 2C:
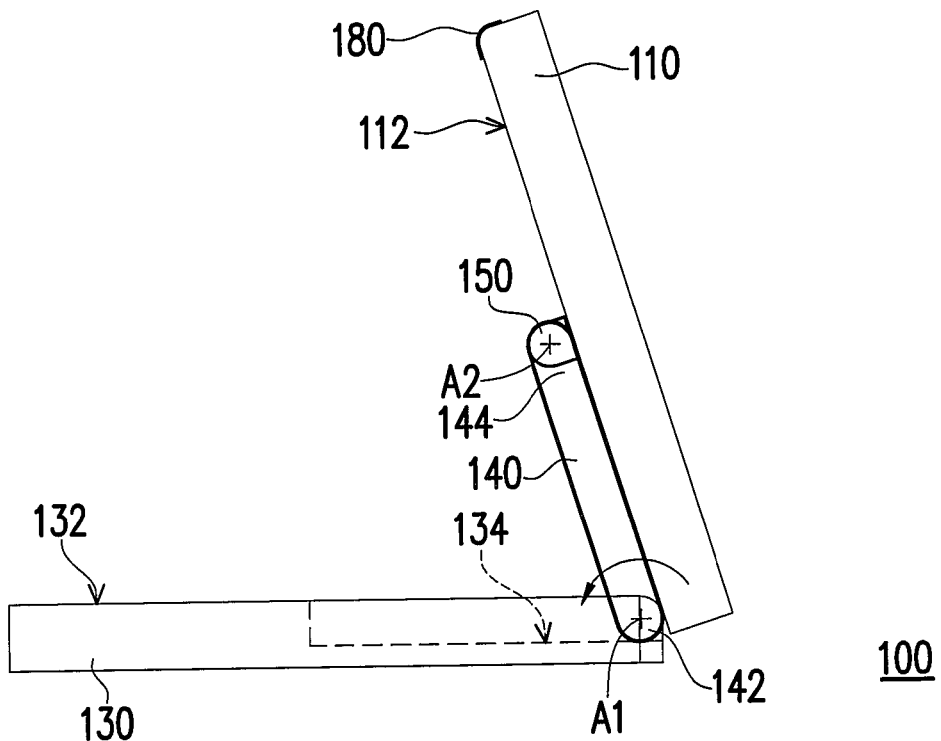
Figure 2D:
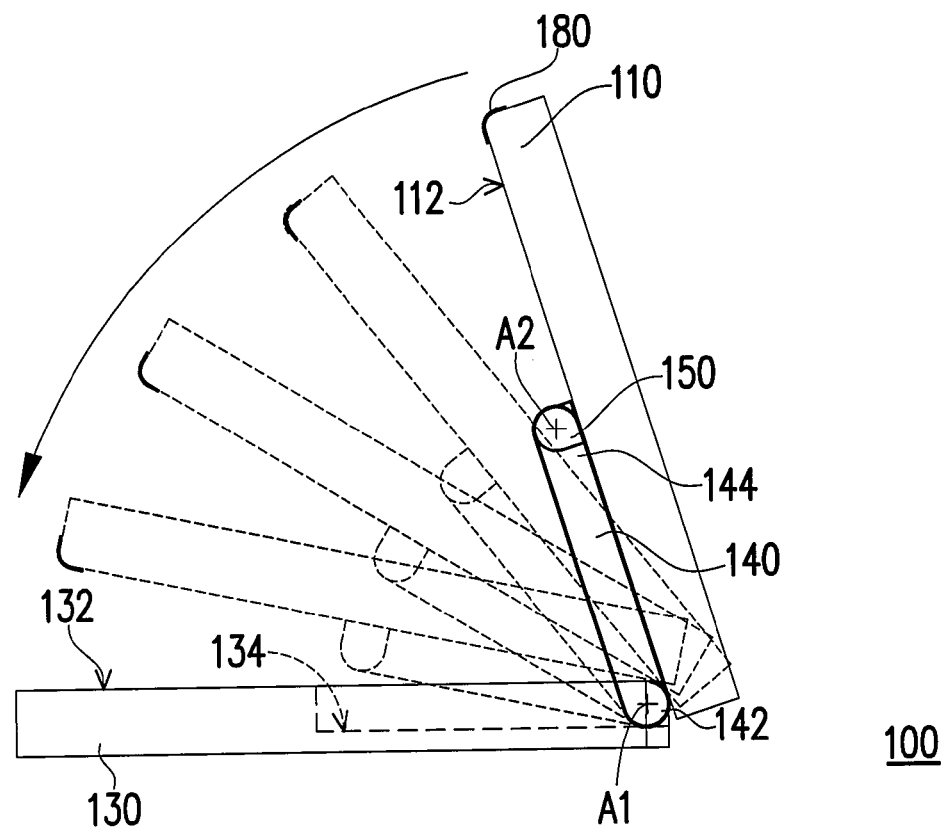
Figure 2E:
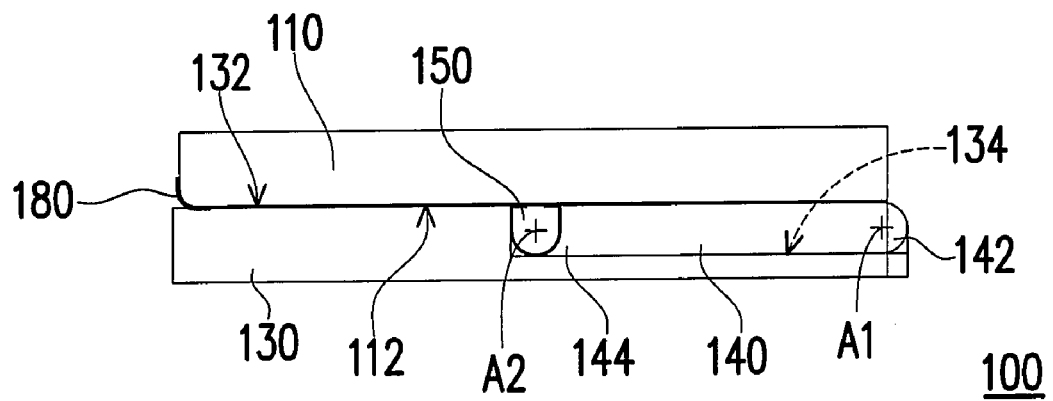

As shown in FIG. 2A, the portable electronic apparatus 100 is in the first use aspect. At this point, the first body 110 is supported by the supporting member 140 to be tilted from the second body 120. Then, as shown in FIG. 2B, the first body 110 rotates along the second rotation axis A2 relative to the second body 130. Subsequently, the first body 110 after rotation is closely adjacent to the supporting member 140, as shown in FIG. 2C. Then, as shown in FIG. 2D, the first body 110 rotates along the first rotation axis A1 relative to the second body 130. Finally, as shown in FIG. 2E, the portable electronic apparatus 100 is in the second use aspect. At this time, the supporting member 140 and the second electrical connector 150 are buried in the recess 134, and the first flat surface 112 of the first body 110 and the second flat surface 132 of the second body 130 are overlapped.

If it is required to make the portable electronic apparatus 100 return to the first use aspect of FIG. 2A from the second use aspect of FIG. 2E, reversely perform the aforementioned steps.

Figure 3:
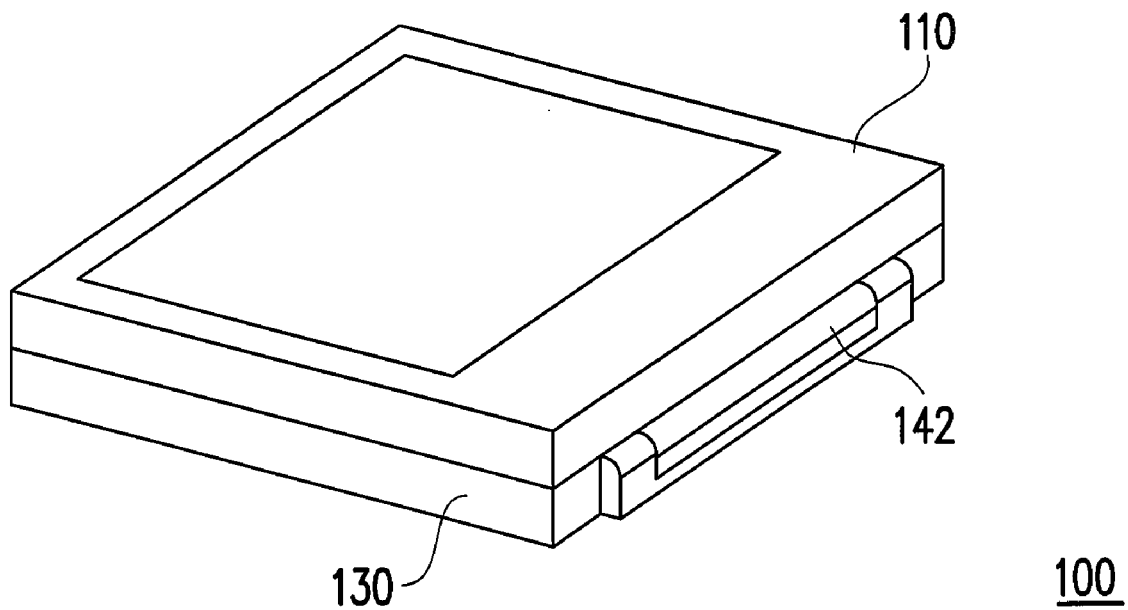
FIG. 3 is a perspective view of the two bodies of the portable electronic apparatus in FIG. 1A in the second use aspect.

FIG. 3 is a perspective view of the two bodies of the portable electronic apparatus in FIG. 1A in the second use aspect. Referring to FIG. 3, in the second use aspect, the method of operating the portable electronic apparatus 100 is the same as the method of operating the first body 110 independently. Besides, in the second use aspect, the user can also use the additional functions of the second body 130.

In view of the above, in this embodiment, the supporting member 140, the first electrical connector 120, and the second electrical connector 150 are disposed on the inner side between the first body 110 and the second body 130, and can be accommodated in the recess 134. Therefore, as compared with the conventional sliding slots and the sliding units, the design of the portable electronic apparatus will not be affected. Furthermore, the supporting member 140 and the second electrical connector 150 have a moving path shorter than that of the conventional sliding unit, and can be operated conveniently.

Figure 4:
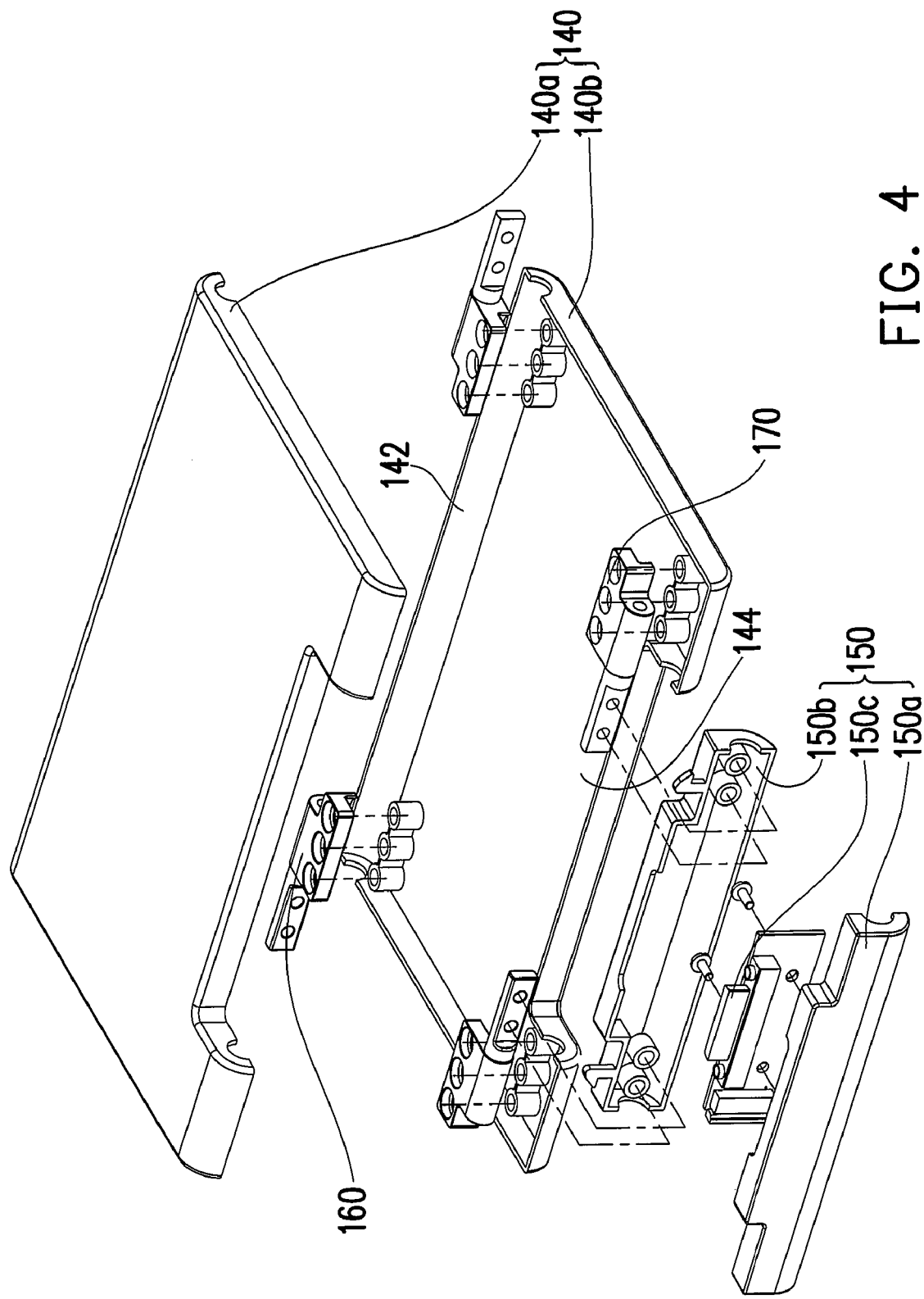
FIG. 4 is an exploded view of the supporting member, the second electrical connector, the first hinge, and the second hinge of the portable electronic apparatus of FIG. 1A.

FIG. 4 is an exploded view of the supporting member, the second electrical connector, the first hinge, and the second hinge of the portable electronic apparatus of FIG. 1A. In this embodiment of the present invention, the portable electronic apparatus 100 can further include a first hinge 160 or a second hinge 170, or the both (as shown in FIG. 1B and FIG. 4). Firstly, referring to FIG. 4, the supporting member 140 includes a top cover 140a and a bottom cover 140b, and the second electrical connector 150 includes a front cover 150a, a rear cover 150b, and a connector 150c, in which the connector 150c is used to be electrically connected to the first electrical connector 120. Then, referring to FIGS. 1B and 4, the first end 142 of the supporting member 140 is pivotally connected to the second body 130 through the first hinge 160, and the second electrical connector 150 is pivotally connected to the second end 144 of the supporting member 140 through the second hinge 170.

After the rotation of the first hinge 160, the angle of the supporting member 140 relative to the second body 130 varies, and after the rotation of the second hinge 170, the angle of the second electrical connector 150 relative to the supporting member 140 varies.

Therefore, as compared with the conventional sliding slots and the sliding units, the structure of the supporting member 140 in this embodiment is simple, so it is easy to assemble.

Referring to FIGS. 1A and 2A again, in an embodiment of the present invention, the portable electronic apparatus 100 can further include a locator 180 disposed on the first body 110 to temporarily fix the position of the first body 110 relative to the second body 130. The locator 180 is, for example, a non-skid layer, which has a surface with a large friction coefficient, so as to temporarily fix the position of the first body 110 relative to the second body 130.

Figure 5:
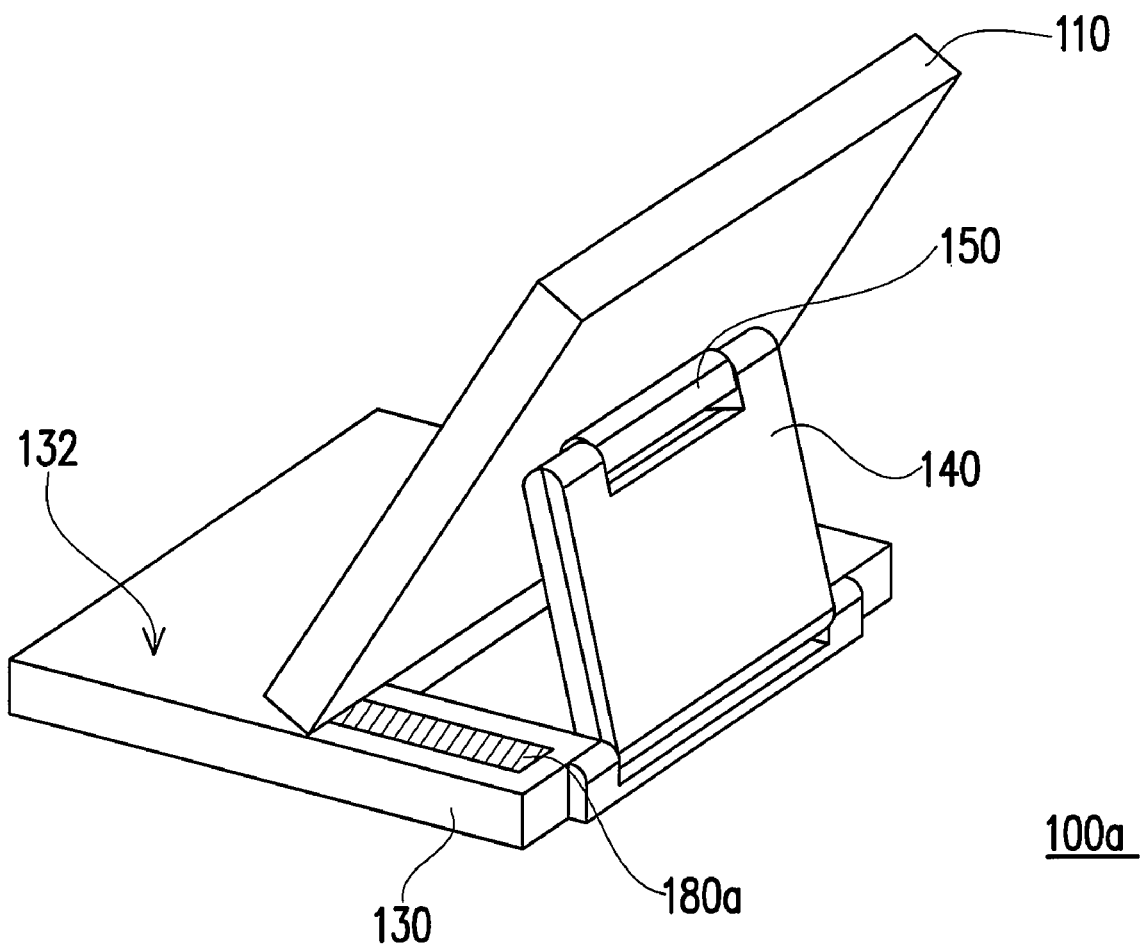
FIG. 5 is a perspective view of the portable electronic apparatus according to another embodiment of the present invention.

FIG. 5 is a perspective view of the portable electronic apparatus according to another embodiment of the present invention. The portable electronic apparatus 100a is substantially the same as the portable electronic apparatus 100 except that locator 180a of the portable electronic apparatus 100a is disposed on the second flat surface 132 of the second body 130. The locator 180a disposed on the second flat surface 132 is, for example, a non-skid layer or a fixing pad with a plurality of recesses, and the function of the locator 180a is similar to that of the locator 180 of FIGS. 1A and 2A.

Referring to FIG. 1A or 5, the second body 130, the supporting member 140, and the second electrical connector 150 of the portable electronic apparatus 100 or 100a can be regarded as a base together. Furthermore, the base may also include the first hinge 160, the second hinge 17, or the locator 180a disposed on the second flat surface 132 of the second body 130, in which the first hinge 160, the second hinge 170, and the locator 180a are the same as those described in the aforementioned embodiment.

In view of the above, the present invention has at least the following advantages.

1. The supporting member, the first electrical connector, and the second electrical connector of the present invention are disposed on the inner side between the first body and the second body, and thus as compared with the conventional sliding slots and the sliding units, the design of the portable electronic apparatus will not be affected.

2. The supporting member and the second electrical connector have a moving path shorter than that of the conventional sliding units, and can be operated conveniently.

3. Compared with the conventional sliding slots and the sliding units, the structure of the supporting member of the present invention is simple, so it is easy to assemble.

4. Through the temporarily fixing of the locator, users can freely adjust the angle formed between the tow bodies, and thus the humanized operation is achieved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A base, applicable to a portable electronic apparatus, wherein the portable electronic apparatus comprises a first body which has a first electrical connector, the base comprising:

a second body;

a supporting member, having a first end and a second end opposite to the first end, wherein the first end is pivotally connected to the second body along a first rotation axis;

a second electrical connector for connecting with the first electrical connector, pivotally connected to the second end along a second rotation axis, wherein when the second electrical connector is connected to the first electrical connector, the angle of the supporting member relative to the second body varies corresponding to the height of the second electrical connector relative to the second body, while the angle of the second electrical connector relative to the supporting member varies corresponding to the angle variation of the first body relative to the second body, wherein the second body has a recess for accommodating the supporting member and the second electrical connector after rotation, such that a first flat surface of the first body is suitable for overlapping with a second flat surface of the second body; and a locator, diposed on the second body to temporarily fix the position of the first body relative to the second body.

2. The base as claimed in claim 1, further comprising:

a first hinge, through which the first end of the supporting member is pivotally connected to the second body.

3. The base as claimed in claim 1, further comprising:

a second hinge, through which the second electrical connector is pivotally connected to the second end of the supporting member.

4. The base as claimed in claim 1, wherein the first rotation axis is substantially parallel to the second rotation axis.

5. The base as claimed in claim 1, wherein the locator is a non-skid layer.

6. A portable electronic apparatus, comprising:
   a first body;
   a first electrical connector, fixed on the first body;
   a second body;
   a supporting member, having a first end and a second end opposite to the first end, wherein the first end is pivotally connected to the second body along the first rotation axis;
   a second electrical connector for connecting with the first electrical connector, pivotally connected to the second end along a second rotation axis, wherein when the second electrical connector is connected to the first electrical connector, the angle of the supporting member relative to the second body varies corresponding to the height of the second electrical connector relative to the second body, while the angle of the second electrical connector relative to the supporting member varies corresponding to the angle variation of the first body relative to the second body,
   wherein the second body has a recess for accommodating the supporting member and the second electrical connector after rotation, such that a first flat surface of the first body is suitable for overlapping with a second flat surface of the second body; and
   a locator, disposed on the first body or the second body to temporarily fix the position of the first body relative to the second body.

7. The portable electronic apparatus as claimed in claim 6, further comprising:
   a first hinge, through which the first end of the supporting member is pivotally connected to the second body.

8. The portable electronic apparatus as claimed in claim 6, further comprising:
   a second hinge, through which the second electrical connector is pivotally connected to the second end of the supporting member.

9. The portable electronic apparatus as claimed in claim 6, wherein the first rotation axis is substantially parallel to the second rotation axis.

10. The portable electronic apparatus as claimed in claim 6, wherein the locator is a non-skid layer.

11. The portable electronic apparatus as claimed in claim 6, wherein the second body is a computer docking station, and the first body is a tablet PC.

12. The portable electronic apparatus as claimed in claim 6, wherein the second body is a computer system base, and the first body is a display.

* * * * *